United States Patent Office 3,466,341
Patented Sept. 9, 1969

3,466,341
PROCESS FOR THE PREPARATION OF TRIFLUOROMETHANE
Heinrich Pauksch, Langenhagen, and Joachim Massonne, Hannover, Germany, assignors to Kali-Chemie Aktiengesellschaft, Hannover, Germany, a corporation of Germany
No Drawing. Filed Mar. 4, 1968, Ser. No. 709,956
Claims priority, application Germany, Mar. 10, 1967, K 61,687
Int. Cl. C07c *17/20, 17/24*
U.S. Cl. 260—653.8        7 Claims

ABSTRACT OF THE DISCLOSURE

Trifluoromethane is prepared by contacting difluoromonochloromethane or monofluorodichloromethane with aluminum halide suspended in an inert liquid at a temperature of −10 to +150° C. and pressures of 0.2 to 50 atm.

---

This invention relates to a process for the preparation of trifluoromethane.

Trifluoromethane, $CHF_3$, has considerable importance as a cooling agent at low temperatures. It has been prepared by treating difluoromonochloromethane and/or monofluorodichloromethane with aluminum fluoride or aluminum chloride in the vapor phase. Thereby, chloroform is always obtained as a by-product. The reaction proceeds with disproportionation according to the equations:

(1) $3CHF_2Cl \rightarrow 2CHF_3 + CHCl_3$ (2) $3CHFCl_2 \rightarrow CHF_3 + 2CHCl_3$ The aluminum halide is employed in form of coarse particles. As the reaction is exothermic, the catalyst bed must be cooled. Excessive temperatures at the catalyst produce decomposition reactions and inactivate the catalyst. Particularly when large charges are reacted, it is difficult to remove the heat of reaction.

Therefore, Patent No. 2,426,638 had proposed to dilute the catalyst with solid materials which are good conductors of heat, such as alumina, silica gel, or steel Raschig rings. But even such means cannot avoid the production of so-called hot spots in the catalyst. Even when the gaseous starting materials were diluted with the gaseous end product, the rate of feed had to be kept low to obtain good yields of trifluoromethane, nonetheless, in spite of careful operation, the life of the catalyst was rather short.

From Patent No. 2,676,996, it is also known to disproportionate difluoromonochloromethane and/or monofluorodichloromethane in the gaseous state, using aluminum fluoride as a catalyst at temperatures between 300 and 400° C., into trifluoromethane and chloroform. Good yields are obtained only when the aluminum fluoride is used in very fine crystalline form. The above mentioned difficulties arise also in this process.

It is, therefore, a principal object of the invention to provide a process for the preparation of trifluoromethane by treatment of difluoromonochloromethane and/or monofluorodichloromethane with aluminum halide which avoids the recited difficulties and produces good yields.

Other objects and advantages will be apparent from a consideration of the specification and claims.

According to the invention, the aluminum halide catalyst is suspended in chloroform and the reaction is carried out at a temperature between −10 and +150° C. at pressures between 0.2 to 50 atm. Suitable aluminum halides are aluminum fluoride, chloride, or bromide. Generally, we prefer aluminum chloride because the commercial anhydrous product can be used, without further pre-treatment, in form of fine or coarse grains. At the start of the reaction, it is of advantage to maintain the throughput of the compounds to be disproportionated at a low rate; said rate is then increased within a period up to 24 hours to the final rate of feed. During that time, the aluminum chloride catalyst is converted to a compound which consists essentially of aluminum fluoride and still contains only 1 to 2 percent of chlorine.

It was not to be expected that the conversion e.g. of difluoromonochloromethane in a suspension of aluminum chloride in chloroform would proceed at a satisfactory rate because the catalyst is enveloped in a liquid which does not allow direct contact with the gas bubbles. The catalyst is contacted by the difluoromonochloromethane dissolved in chloroform; therefore, it has to be assumed that the reaction takes place essentially in the liquid phase. However, as the amount of difluoromonochloromethane contacting the catalyst is determined by the solubility of the former under the reaction conditions in chloroform and as the concentration of the difluoromonchloromethane is under normal pressure is rather low, it is surprising that a violent reaction takes place which requires cooling when larger feeds are used.

The liberated heat of reaction is quickly taken up by the liquid and can be transferred to the cooled wall of the reactor. As no hot spots can be formed in the catalyst, its life is considerably prolonged. The possibility of intense cooling allows also of using higher rates of feed. Thereby, it may be of advantage to provide for thorough mixing by stirrers, vibrators, or by circulating the suspension of the catalyst.

By increasing the pressure, the solubility of the difluoromonochloromethane in chloroform can be further increased. This can be pushed so far as to dissolve the starting material completely in chloroform or even feeding it in the liquid state. According to the pressures and temperatures applied, the reaction products can be recovered (a) as gases, (b) as gases and liquid, and (c) as liquid.

The reaction can be carried out at temperatures between −10 and +150° C. At temperatures below −10° C., the rate of reaction is uneconomically slow. A good rate of reaction, high yields, and long life of the catalyst are obtained at temperatures between −5 and +80° C. Suitable pressures are between 0.2 and 50 atm., preferably between 0.5 and 40 atm. Temperatures and pressures should be so adjusted as to keep the catalyst enveloped by liquid at all times.

The reaction can be carried out at atmospheric pressure so as to have a partial pressure of the chloroform in the reaction product, which is about half the partial pressure of the trifluoromethane. In this way, only as much chloroform can be removed from the reactor as is being formed in the reaction. The trifluoromethane can then be separated from the chloroform and obtained in completely pure state by subsequent compression and pressure distillation of the gas mixture.

In another embodiment of the invention, the reaction is carried out in a pressure reactor equipped with distillation column. The reaction conditions can be selected so as to return chloroform and unreacted starting material as reflux into the reactor and to let the formed trifluoromethane escape as vapor. It is of advantage to remove from the reactor chloroform in the liquid state at the rate at which it is being formed. If thereby the chloroform is continuously withdrawn from the reactor over a filter or collecting vessel, an excessive dilution of the catalyst suspension can be avoided.

In a preferred embodiment of the invention the reaction is carried out in a cylindrical reactor under elevated pressure. The reactor is filled with a catalyst bed of aluminum chloride and cooled from the outside. The difluorochloromethane is fed in liquid form into the reactor by means of a suitable pump. Thereby, the starting material may be charged into the bottom or the top of the reactor. The reaction products consist essentially of trifluoromethane and chloroform and are passed from the reactor outlet directly into a pressure column and are fractionated and purified.

It is of advantage to adjust the reaction conditions so as to obtain the trifluoromethane in the reactor in liquid form or completely dissolved in the chloroform. On fractionation, pure trifluoromethane is obtained at the head of the column while the sump contains the chloroform which, depending on the temperature, is enriched with trifluoromethane and small amounts of unreacted difluorochloromethane. Said unreacted starting product can be there also disproportionated by the addition of a small amount of catalyst. In this way, a conversion of almost 100% can be attained.

The following examples are given to illustrate but not to limit the invention.

EXAMPLE 1

The apparatus used was a vertical conical glass tube of 100 cm. length having at the bottom a diameter of 4.5 cm. and at the top a diameter of 7.1 cm.; the tube was equipped at the bottom with a glass inlet pipe and a drain valve. The tube was filled with a suspension of 300 g. of anhydrous aluminum chloride of commercial grade in 1.5 liter of chloroform. Difluoromonochloromethane gas was introduced at a rate of 30 l./hour. After a short time, the aluminum chloride became discolored first to brown and then to black without any substantial decline of its activity. The temperature in the reactor adjusted to about 22° C. After 450 hours of operation, the reaction was still almost quantitative. The gas effluent had the following composition, in percent by volume:

| | |
|---|---|
| $CHF_3$ | 69.4 |
| $CHF_2Cl$ | 0.6 |
| $CHFCl_2$ | 0.1 |
| $CHCl_3$ | 29.9 |

After separation from the aluminum chloride, the chloroform phase contained less than 1 percent by weight of dissolved $CHF_3$, $CHF_2Cl$, and $CHFCl_2$.

Similar results were obtained when, instead of difluoromonochloromethane, gaseous monofluorodichloromethane or a mixture of the two compounds were used as starting material.

EXAMPLE 2

A suspension of 750 g. of anhydrous aluminum chloride in 940 g. of chloroform was placed into a two liter autoclave equipped with stirrer, dip tube, cooling jacket, and with a pressure column provided with cooler and a release valve above said cooler.

By means of a pressure pump, 0.6 to 0.7 kg./hour of liquid difluoromonochloromethane were passed through the dip tube into the reactor, with stirring. The temperature in the reactor was maintained at 20 to 23° C. by cooling with water of 12 to 15° C. The cooler above the pressure column was cooled at 12 to 15° C. The pressure in the reactor adjusted at 27 to 35 atm. The gas withdrawn from the expansion valve consisted of more than 99.9% by volume of trifluoromethane.

EXAMPLE 3

5.6 kg. (5.0 liter) of aluminum chloride, grain size 5 to 20 mm., were packed into a cylindrical vertical steel reactor, capacity 6.67 liter, equipped with a cooling jacket. The pore volume was filled up with chloroform to displace the air. Difluorochloromethane was fed through the lower opening of the reactor by means of a diaphragm pressure metering pump, and from the upper outlet, the reaction mixture was directly passed into a pressure column. Therefore, the pressure in the reactor was controlled by the thermodynamic conditions in the pressure columns and was about 30 to 40 atm. The temperature in the reactor, which was cooled with water of 15° C., was 20 to 40° C., depending on the amount of charged difluorochloromethane. At a feed of 11.3 kg./hour of difluorochloromethane, the conversion was 98.5%. The yield of trifluoromethane, measured at the outlet of the reactor, was 98% by weight, calculated on difluorochloromethane.

We claim:
1. A process of preparing trifluoromethane, comprising contacting a fluorochloromethane of the group consisting of difluoromonochloromethane, monofluorodichloromethane, and mixtures thereof with an aluminum halide catalyst suspended in liquid chloroform at a temperature between —10 and +150° C. at a pressure between 0.2 and 50 atm., said temperature and pressure being so selected that during the reaction the fluorochloromethane is always present in the liquid state or dissolved in the liquid chloroform and the catalyst is enveloped by liquid at all times, and recovering the reaction products trifluoromethane and chloroform formed by said contact.

2. The process claimed in claim 1 wherein said aluminum halide is aluminum chloride.

3. The process claimed in claim 1 wherein said temperature is in the range of —5 to +80° C. and said pressure in the range of 0.5 to 40 atmospheres.

4. The process claimed in claim 1 comprising employing said fluorochloromethane in the gaseous state and recovering said reaction products in the gaseous state.

5. The process claimed in claim 1 comprising employing said fluorochloromethane in the liquid state, recovering trifluoromethane in the gaseous state, and chloroform in the liquid state.

6. The process claimed in claim 1 comprising employing said fluorochloromethane in the liquid state, recovering trifluoromethane and chloroform in the liquid state.

7. The process claimed in claim 1 comprising agitating said aluminum halide suspension.

References Cited
UNITED STATES PATENTS

| | | | |
|---|---|---|---|
| 2,426,638 | 9/1947 | Murray | 260—653.8 |
| 2,676,996 | 4/1954 | Miller | 260—653.8 |

DANIEL D. HORWITZ, Primary Examiner

U.S. Cl. X.R.

260—664